United States Patent [19]

Usry

[11] 4,154,446
[45] May 15, 1979

[54] HIGH TEMPERATURE ROTARY JOINT

[75] Inventor: Joe D. Usry, Salt Lake City, Utah

[73] Assignee: E-Systems, Inc., Dallas, Tex.

[21] Appl. No.: 873,665

[22] Filed: Jan. 30, 1978

[51] Int. Cl.² .................. F16J 15/00; F16L 53/00
[52] U.S. Cl. .................................... 277/22; 277/15; 285/41; 308/77
[58] Field of Search ............... 277/3, 15, 22, 59, 68, 277/16, 70–72 R, 72 FM, 74, 79, 214; 285/41; 308/76, 77

[56] References Cited

U.S. PATENT DOCUMENTS

| 2,127,073 | 8/1938 | Topping ................................ 285/41 |
| 2,799,522 | 7/1957 | King et al. ....................... 285/41 X |
| 2,910,309 | 10/1959 | Snyder et al. ..................... 285/41 |
| 2,937,036 | 5/1960 | Watkins ............................. 285/41 |
| 2,992,842 | 7/1961 | Shevchenko et al. ........... 277/22 X |
| 3,291,489 | 12/1966 | Tracy et al. ...................... 277/15 |
| 3,604,769 | 9/1971 | Latham ............................ 308/76 |
| 3,706,483 | 12/1972 | Irwin ............................... 308/77 |
| 4,018,059 | 4/1977 | Hatch .............................. 277/15 X |

FOREIGN PATENT DOCUMENTS

| 193848 | 1/1924 | United Kingdom .................. 277/16 |
| 922234 | 3/1963 | United Kingdom ............ 277/72 FM |

Primary Examiner—Robert S. Ward, Jr.
Attorney, Agent, or Firm—Robert V. Wilder

[57] ABSTRACT

A pressure-tight, rotary pipe joint couples rotating, high temperature gas transmission lines. Pressure seals of the pipe joint are maintained at a temperature lower than that of the transmitted gas by thermally insulating the seals from the gas and by pumping a fluid coolant through an annular cavity located adjacent the seals. As an alternate to fluid cooling, a metallic member, in which the pressure seals are disposed, is cooled by means of fins which transfer heat to the adjacent air.

11 Claims, 2 Drawing Figures

HIGH TEMPERATURE ROTARY JOINT

BACKGROUND OF THE INVENTION

This invention relates to high temperature transmission piping, and more particularly, to a rotary pipe coupling having apparatus for cooling the pressure seals.

In certain types of steam-driven electric generating systems, the steam pipelines must be shifted from one position to another. For example, a solar energy collection system which uses a fixed concentration mirror has a moving focal point wherein its location is dependent upon the relationship of the sun to the the mirror. To collect energy in such a system, the collection device must move through a wide range of positions during the day in order to maintain itself at the focal point of the solar radiation. If the energy is collected by means of converting water to steam, the piping must transport the steam at high temperature and pressure. Rotary couplings used in such a system must withstand both high temperature and pressure. Therefore, there is a need for a rotary joint that is mechanically reliable, has little gas or thermal leakage, and rotates with minimal friction.

High-temperature rotary joints and couplings are not new to the art, as shown by U.S. Pat. No. 3,057,646 to Brumagim which discloses a coupling that connects abutting steam pipes, and has a conduction path for carrying a fluid to cool the pressure seal. U.S. Pat. No. 2,127,073 to Topping illustrates an air-cooled steam pipe expansion joint in which the packing material is thermally isolated to some extent from the high-temperature gas. These devices, however, do not provide the pressure seal thermal isolation, design simplicity, and mechanical flexibility called for in current dynamic steam piping systems.

SUMMARY OF THE INVENTION

In accordance with the present invention there is provided a rotary, high temperature, pipe joint with insulation and external cooling means for maintaining pressure seals at a lower temperature than the transported medium.

A rotary member having spaced apart inner and outer walls with an insulating layer between the walls is disposed within a stationary manifold which carries pressure seals that contact the outer surface of the outer wall of the rotary member. An annular groove is formed on the inner surface of the manifold adjacent the pressure seals to form a chamber completed by the outer surface of the rotary member. Coolant fluid is pumped through this chamber to cool the pressure seals and thus maintain them at a lower temperature than that of the medium being transmitted through the rotary member. A thrust bearing maintains the rotary member disposed tightly within the manifold. Full rotation of the rotary member is achieved with relation to the outer, stationary manifold.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE PREFERRED EMBODIMENT

Figure 1:
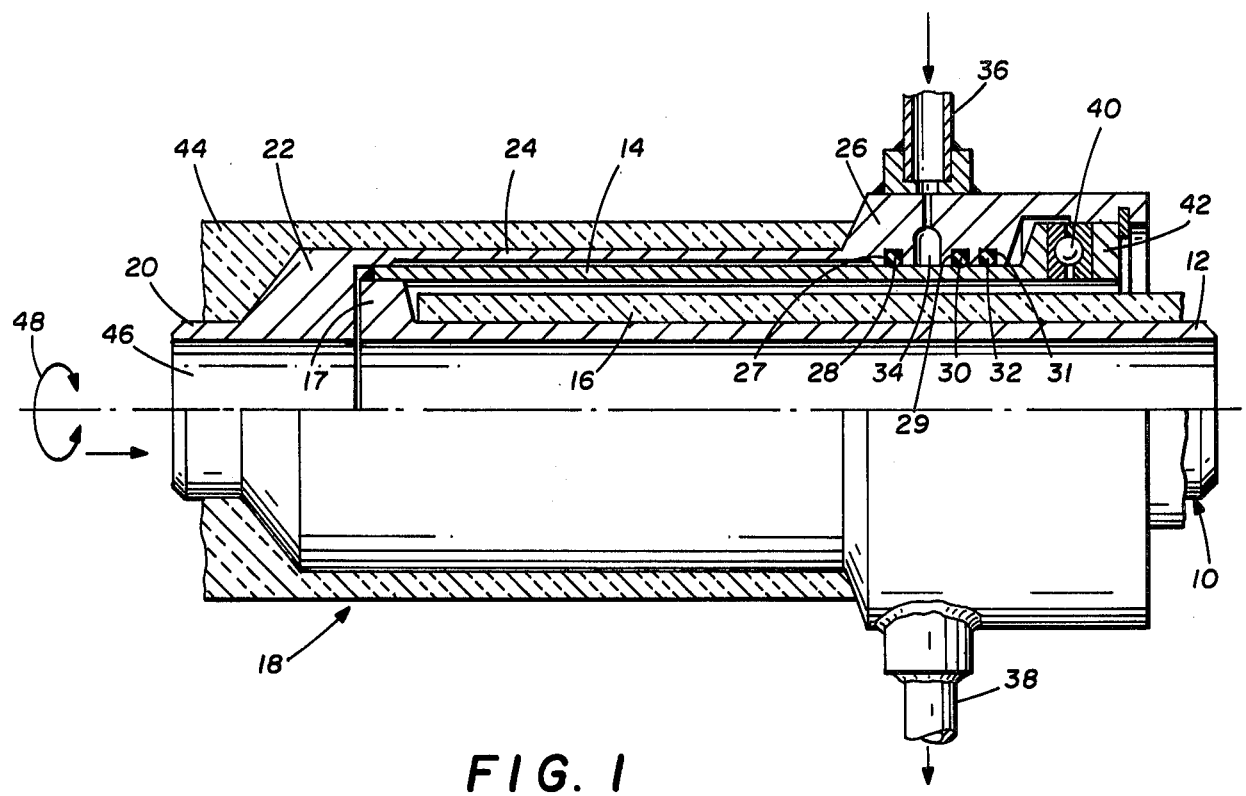
FIG. 1 is a partial sectional view of a rotary joint with fluid-cooled seals.

FIG. 1 illustrates a rotary coupling in accordance with the present invention. A rotary member 10 has a tubular inner wall 12 and a tubular outer wall 14. Between the two walls is a layer of insulation 16. The walls 12 and 14 are open at one end of the rotary member 10 and are joined together at the opposite end by a flange 17.

A manifold 18 has a tubular section 20 joined to a flange 22 which is in turn joined to a tubular section 24. Tubular section 20 has a lesser diameter than the tubular section 24. An expanded wall thickness tubular member 26 is coaxially joined to the tubular section 24. Disposed within a set of annular grooves 27, 29 and 31 in the tubular member 26 are a series of pressure seals 28, 30 and 32 in the form of O-rings. These O-rings are supported by tubular member 26 and are contiguous the outer surface of the outer wall 14. An annular groove 34 is formed within the tubular member 26 and is open to the surface of the outer wall 14 thereby forming an annular chamber. Annular groove 34 is in fluid communication with an input port 36 and an exhaust port 38.

A thrust bearing 40 is disposed between a flange 41 joined to the outer wall 14 and a retainer plate 42. The retainer plate 42 is fastened to the tubular member 26 to maintain the rotary member 10 disposed within the manifold 18 and adjacent the flange 22. The pressure of the gas transported through the coupling creates an axial force tending to separate rotary member 10 from manifold 18. Thrust bearing 40 carries the force between the members 10 and 18.

A sheath of insulation 44 is wrapped around the tubular section 20, flange 22 and the tubular section 24 to prevent loss of heat from the gas being transported through the coupling.

A hot gas, such as steam, is transported through the center of tubular section 20, flange 22, and through the tubular inner wall 12. Rotary member 10 is free to rotate in either direction of the arrow 48, thus providing a rotatable gas joint.

It is essential that the coupling maintain pressure integrity despite both the rotation of the joint and the high temperature of the gas. Pressure seals 28, 30 and 32 are made of a flexible material such as rubber or TEFLON (Trademark of DuPont), but at high temperature, the performance of these materials is degraded and the lifetime is seriously shortened. The temperature of the steam passing through the coupling reaches as high as 1,000 degrees F and few sealant materials can function at this temperature. Further, the materials which will operate at this temperature are very expensive, and in any event, have a short operational life.

In accordance with the present invention there is provided a structure whereby the seals operate at a temperature significantly lower than that of the transmitted gas. The insulation 16 provides substantial insulation of the seals from the high temperature gas. The metallic conduction path, through which heat can flow from the gas to the seals, comprises the tubular outer wall 14 and the tubular section 24, both of which have relatively small cross-sectional areas, and therefore, conduct heat at a low rate. The length of the small, cross-section area members also inhibits the flow of heat to the seals. By utilizing insulation and thin wall tubing, the heat loss from the transmitted gas is reduced thereby raising the overall efficiency of the system. The low heat loss in each joint makes possible the use of a plurality of joints to achieve a high degree of flexibility in a single piping system.

Seals 28, 30 and 32 are externally cooled by means of a flow of liquid through the input port 36, around the annular groove 34 and out through the exhaust port 38. As the coolant flows through the annular groove 34, it absorbs heat from the tubular member 26 which in turn absorbs heat from the pressure seals 28, 30 and 32. Thus, by means of the insulation and the fluid coolant, it is possible to maintain the seals at a temperature much lower than that of the high temperature gas. For example, with 1,000 degree F steam, the seals can be maintained at a temperature of no more than 350 degrees F. At this temperature, the pressure seals can be made of inexpensive and long-lasting material such as rubber or plastic.

When the rotary coupling is used as a part of an overall steam generation system, the boiler water can be used as the coolant for the coupling. The pressure of the boiler water is always greater than the system steam pressure, therefore, if any leak develops in the coupling, water will be forced into the steam rather than the steam venting away from the coupling. This provides a substantial safety advantage for the coupling as well as adjacent equipment and personnel. An uncontrolled steam leak could easily destroy the joint and nearby equipment, but due to the higher pressure of the water, any leak will cause water to flow into the steam. Water droplets are removed from the steam prior to using it within a turbine by passing the steam through a separator. In addition, the heat absorbed by the fluid coolant will serve to preheat the incoming boiler water and thus, to some extent, improve the efficiency of the system.

Figure 2:
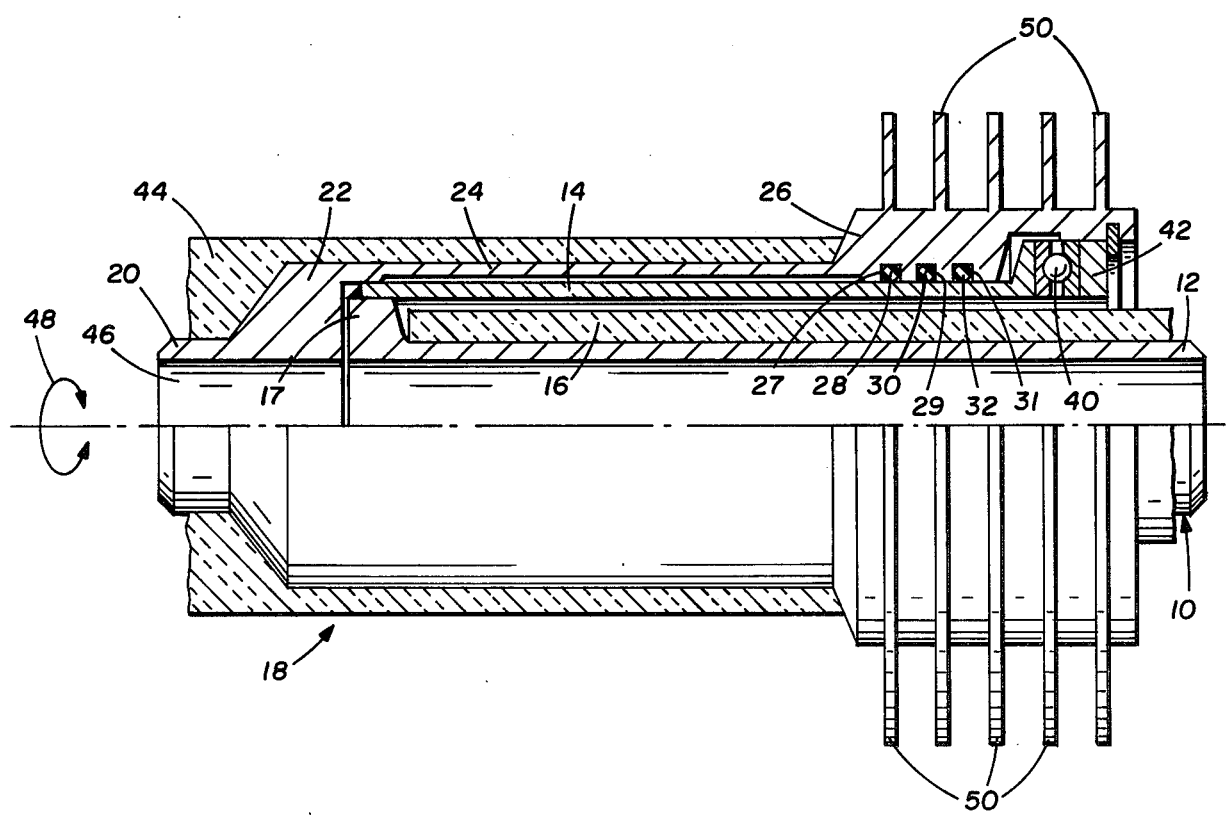
FIG. 2 is a partial sectional view of a rotary joint with air-cooled seals.

The fluid cooling system for the pressure seals 28, 30 and 32 can be replaced by an air cooling system as illustrated in FIG. 2. In this embodiment the input and output ports for the fluid coolant as well as the annular groove for the embodiment shown in FIG. 1 have been eliminated and replaced with a set of cooling fins 50. The tubular member 26 absorbs heat from the pressure seals 28, 30 and 32 and in turn transfers this heat to the cooling fins 50 which transfer the heat to the surrounding air. Although this system generally does not provide the degree of cooling provided by the fluid coolant, it does maintain the pressure seals at a temperature substantially lower than that of the high temperature gas. When a gas with a temperature of 1,000 degrees F is transmitted through the coupling, the seals are maintained at a temperature of approximately 500 degrees F. This reduction in temperature greatly enhances the pressure-holding capability of the coupling and extends the lifetime of the seals. The remaining structure in this embodiment is the same as that in the embodiment of FIG. 1.

An additional advantage in cooling the tubular member 26 in both of the previous embodiments is that it also maintains the thrust bearing 40 at a lower temperature to make possible the use of low temperature grease. Grease used at lower temperatures is less expensive and longer lasting than the grease that would have to be used if the thrust bearing were exposed to the heat of the gas.

Therefore, in accordance with the present invention, there is provided a rotary, sealed coupling for the transmission of high-temperature gas in which the seals are cooled to operate at a temperature substantially lower than that of the gas.

Although several embodiments of the invention have been illustrated in the accompanying drawings and described in the foregoing detailed description, it will be understood that the invention is not limited to the embodiments disclosed, but is capable of numerous rearrangements, modifications and substitutions without departing from the scope of the invention.

What is claimed is:

1. A rotary pipe joint having a cooled pressure seal, comprising:
   a rotary member having spaced, tubular, coaxial inner and outer walls, said walls joined together by a first flange at a first end of said rotary member;
   a manifold having a tubular first wall coaxial with said rotary member, an annular groove disposed on the interior of said first wall, a first port in fluid communication with said annular groove, a second port circumferentially disposed from said first port and in fluid communication with said annular groove, and said manifold dimensioned to have said rotary member disposed therein; and
   pressure sealing means disposed adjacent said annular groove for forming a seal between the exterior surface of said rotary member and the interior surface of said manifold.

2. A rotary pipe joint as recited in claim 1 further including bearing means disposed between said rotary member and said manifold for carrying axial force between said rotary member and said manifold.

3. A rotary pipe joint as recited in claim 2 wherein said bearing means comprises a thrust bearing disposed between a flange joined to said rotary member and a retainer plate joined and normal to said manifold.

4. A rotary pipe joint as recited in claim 1 wherein said first end of said rotary member is contiguous a second flange joined to said manifold.

5. A rotary pipe joint having a cooled pressure seal, comprising:
   a rotary member having spaced, tubular, coaxial inner and outer walls, said walls joined together by a first flange at a first end of said rotary member;
   a manifold having a tubular first wall coaxial with said rotary member, an annular groove disposed on the interior of said first wall, a first port in fluid communication with said annular groove, and said manifold dimensioned to have said rotary member disposed therein;
   first pressure sealing means for forming a seal between the exterior surface of said rotary member and the interior surface of said manifold; and
   second pressure sealing means for forming a seal between the exterior surface of said rotary member and the interior surface of said manifold, said second pressure sealing means disposed on the opposite side of said annular groove from said first pressure sealing means.

6. A rotary pipe joint having a cooled pressure seal, comprising:
   a rotary member having spaced, tubular, coaxial inner and outer walls, said walls joined together by a first flange at a first end of said rotary member;
   a manifold having a tubular first wall coaxial with said rotary member, an annular groove disposed on the interior of said first wall, a first port in fluid communication with said annular groove, a second port in fluid communication with said annular groove, and said manifold dimensioned to have said rotary member disposed therein;

pressure sealing means for forming a seal between the exterior surface of said rotary member and the interior surface of said manifold; and a thermal insulation jacket disposed between said inner wall and said outer wall of said rotary member.

7. A rotary pipe joint having a cooled pressure seal, comprising:

a rotary member having spaced, tubular, coaxial inner and outer walls, said walls joined together by a first flange at a first end of said rotary member;

a manifold having a tubular first wall coaxial with said rotary member, an annular groove disposed on the interior of said first wall, a first port in fluid communication with said annular groove, a second port in fluid communication with said annular groove, and said manifold dimensioned to have said rotary member disposed therein;

said tubular first wall including a first tubular section that includes said annular groove, said inport port, said output port, and contacts said first pressure sealing means and a second tubular section coaxial with said first tubular section and having a thinner wall dimension than said first tubular section; and pressure sealing means for forming a seal between the exterior surface of said rotary member and the interior surface of said manifold.

8. A rotary pipe joint having a cooled pressure seal, comprising:

a rotary member having spaced, tubular, coaxial inner and outer walls, said walls joined together by a first flange at a first end of said rotary member;

a manifold having a tubular first wall coaxial with said rotary member and dimensioned to have said rotary member disposed therein;

pressure sealing means for forming a seal between the exterior surface of said rotary member and the interior surace of said manifold;

a thermal insulation jacket disposed between said inner wall and said outer wall of said rotary member; and means for transferring heat from said manifold.

9. A rotary pipe joint as recited in claim 8 wherein said means for transferring heat comprises a plurality of heat-dissipating fins joined to said manifold.

10. A rotary pipe joint having a cooled pressure seal, comprising:

a rotary member having spaced, tubular, coaxial inner and outer walls, said walls joined together by a first flange at a first end of said rotary member;

a manifold having a tubular first wall coaxial with said rotary member and dimensioned to have said rotary member disposed therein;

said tubular first wall including a first tubular section that contacts said pressure sealing means and is joined to said means for transferring heat and a second tubular section coaxial with and joined to said first tubular section and having a thinner wall dimension than said first tubular section;

pressure sealing means for forming a seal between the exterior surface of said rotary member and the interior surface of said manifold; and means for transferring heat from said manifold.

11. A rotary pipe joint having a cooled pressure seal, comprising:

a rotary member having spaced, tubular, coaxial inner and outer walls, said walls joined together by a first flange at a first end of said rotary member;

a manifold having a tubular first wall coaxial with said rotary member, an annular groove disposed on the interior of said first wall, and dimensioned to have said rotary member disposed therein;

first and second pressure sealing means for forming a seal between the exterior surface of said rotary member and the interior surface of said manifold; and means for transferring heat from said manifold.

* * * * *